United States Patent
Yen et al.

(10) Patent No.: US 7,631,841 B1
(45) Date of Patent: Dec. 15, 2009

(54) BRACKET WITH A HORIZONTAL DISPLACEMENT COMPENSATION CAPACITY

(75) Inventors: Ching-Hui Yen, Banciao (TW); Chun-Lung Chen, Banciao (TW)

(73) Assignee: Syncmold Enterprise Corp., Taipei County (TW)

( * ) Notice: Subject to any disclaimer, the term of this patent is extended or adjusted under 35 U.S.C. 154(b) by 0 days.

(21) Appl. No.: 12/155,855

(22) Filed: Jun. 11, 2008

(51) Int. Cl.
*F16L 3/00* (2006.01)
(52) U.S. Cl. ............ 248/121; 248/286.1; 248/917
(58) Field of Classification Search ............ 248/121, 248/346.06, 917, 919, 920, 921, 922, 923, 248/286.1; 361/679.02, 679.21
See application file for complete search history.

(56) References Cited

U.S. PATENT DOCUMENTS

| | | | | |
|---|---|---|---|---|
| 7,048,242 B2* | 5/2006 | Oddsen, Jr. | ............ | 248/280.11 |
| 7,178,774 B2* | 2/2007 | Kim | ............ | 248/279.1 |
| 7,370,838 B2* | 5/2008 | Jeong et al. | ............ | 248/125.7 |
| 7,384,019 B2* | 6/2008 | Choi | ............ | 248/136 |
| 2006/0219849 A1* | 10/2006 | Chiu | ............ | 248/125.8 |
| 2007/0152125 A1* | 7/2007 | Lee | ............ | 248/398 |
| 2007/0210221 A1* | 9/2007 | Kim et al. | ............ | 248/124.1 |
| 2008/0100567 A1* | 5/2008 | Tsai | ............ | 345/156 |

* cited by examiner

*Primary Examiner*—Ramon O Ramirez
(74) *Attorney, Agent, or Firm*—Rosenberg, Klein & Lee

(57) ABSTRACT

A bracket with a horizontal displacement compensation capacity includes a base, a sliding stand, an elastic element, a displacement compensation linkage assembly, and a support body. The sliding stand slides on the base. Both ends of the elastic element are respectively fixed to the base and the sliding stand. The displacement compensation linkage assembly includes a first rod, a second rod and an abutting piece. The rods are for connecting to the base and the sliding stand. The abutting piece is pivotally connected to the pivoting portion between the other ends of the first and second rods. Via the above arrangement, when the support body is swinging, a displacement compensation action can be generated in the horizontal direction, so that the viewing distance between a supported article and a user can be kept constant. Furthermore, the vertical height can be adjusted and the horizontal distance can be kept simultaneously.

9 Claims, 7 Drawing Sheets

BRACKET WITH A HORIZONTAL DISPLACEMENT COMPENSATION CAPACITY

BACKGROUND OF THE INVENTION

1. Field of the Invention

The present invention relates to a bracket with a horizontal displacement compensation capacity, and in particular to a bracket that is capable of supporting an article and adjusting the position of the supported article with a horizontal displacement compensation effect.

2. Description of Related Art

A bracket is widely used to support many articles. However, with the development of industrial technology and the spread of electronic products, the construction and function of the bracket have become more and more complicated. For example, in order to provide an optimal viewing angle of a LCD display for a user, the bracket not only needs to support the LCD display firmly, but also has to generate a swinging or rotating movement properly, so that the user can adjust the position of the bracket with respect to the LCD display.

Please refer to FIG. 1. A conventional bracket includes a base 1a and a support body 2a. The support body 2a is pivotally connected on the base 1a. The display 3a is provided at the distal end of the support body 2a. In this way, when the user intends to adjust the relative position of the display 3a, the user can swing the support body 2a to adjust the height of the display 3a.

However, since the support body 2a of the conventional bracket is pivotally connected on the base 1a, the display 3a will inevitably be inclined forwards or backwards when the user intends to adjust the relative height of the display 3a. Such an inclining movement generates a horizontal displacement between the display 3a and the user, which will change the distance between the user and the display 3a directly. As a result, the user has to move the base or his position until the best viewing distance is obtained.

Consequently, because of the above limitation resulting from the technical design of prior art, the inventor strives via real world experience and academic research to develop the present invention, which can effectively improve the limitations described above.

SUMMARY OF THE INVENTION

The object of the present invention is to provide a bracket with a horizontal displacement compensation capacity, whereby the user can adjust the relative height of a supported article with the viewing distance kept constant between the display and the user. Furthermore, the vertical height can be adjusted and the horizontal distance can be kept simultaneously, thereby improving the impression and vantage point in use.

In order to achieve the above objects, the present invention provides a bracket with a horizontal displacement compensation capacity, which includes a base; a sliding stand sliding on the base; at least one elastic element with both ends thereof being fixed to the base and the sliding stand respectively; a displacement compensation linkage assembly comprising a first rod, a second rod and an abutting piece, one end of the first rod being pivotally connected to the base, one end of the second rod being pivotally connected to the sliding stand, the other end of the first rod being pivotally connected to the other end of the second rod, the abutting piece being pivotally connected to the pivoting portion between the other ends of the first and second rods; and a support body pivotally connected on sliding stand and abutting against the abutting piece of the displacement compensation linkage assembly.

The present invention has advantageous features as follows. With the relative movement among the sliding stand, the elastic element and the displacement compensation linkage assembly, a horizontal displacement compensation action can be generated when the support body swings. In this way, when the user adjusts the relative height of the display, the distance between the display and the user is kept constant. Furthermore, the vertical height can be adjusted and the horizontal distance can be kept simultaneously, thereby improving the impression and vantage point while in use.

In order to further understand the characteristics and technical contents of the present invention, a detailed description relating thereto will be made with reference to the accompanying drawings. However, the drawings are illustrative only, but not used to limit the scope of the present invention.

DETAILED DESCRIPTION OF THE PREFERRED EMBODIMENTS

Figure 1:
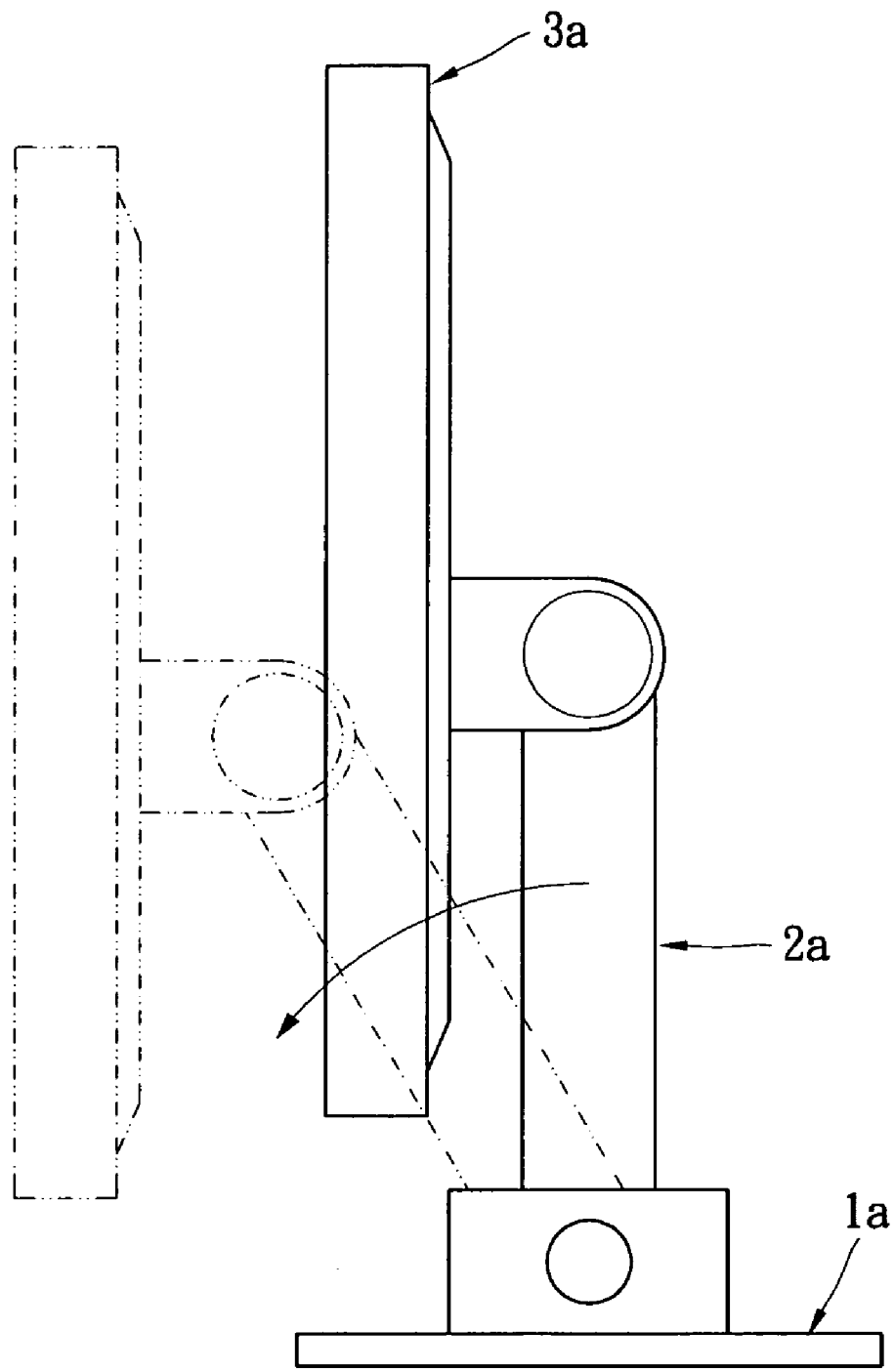
FIG. 1 is a schematic view showing a conventional bracket generating a horizontal displacement in a forward and backward direction during its operation.
Figure 2:
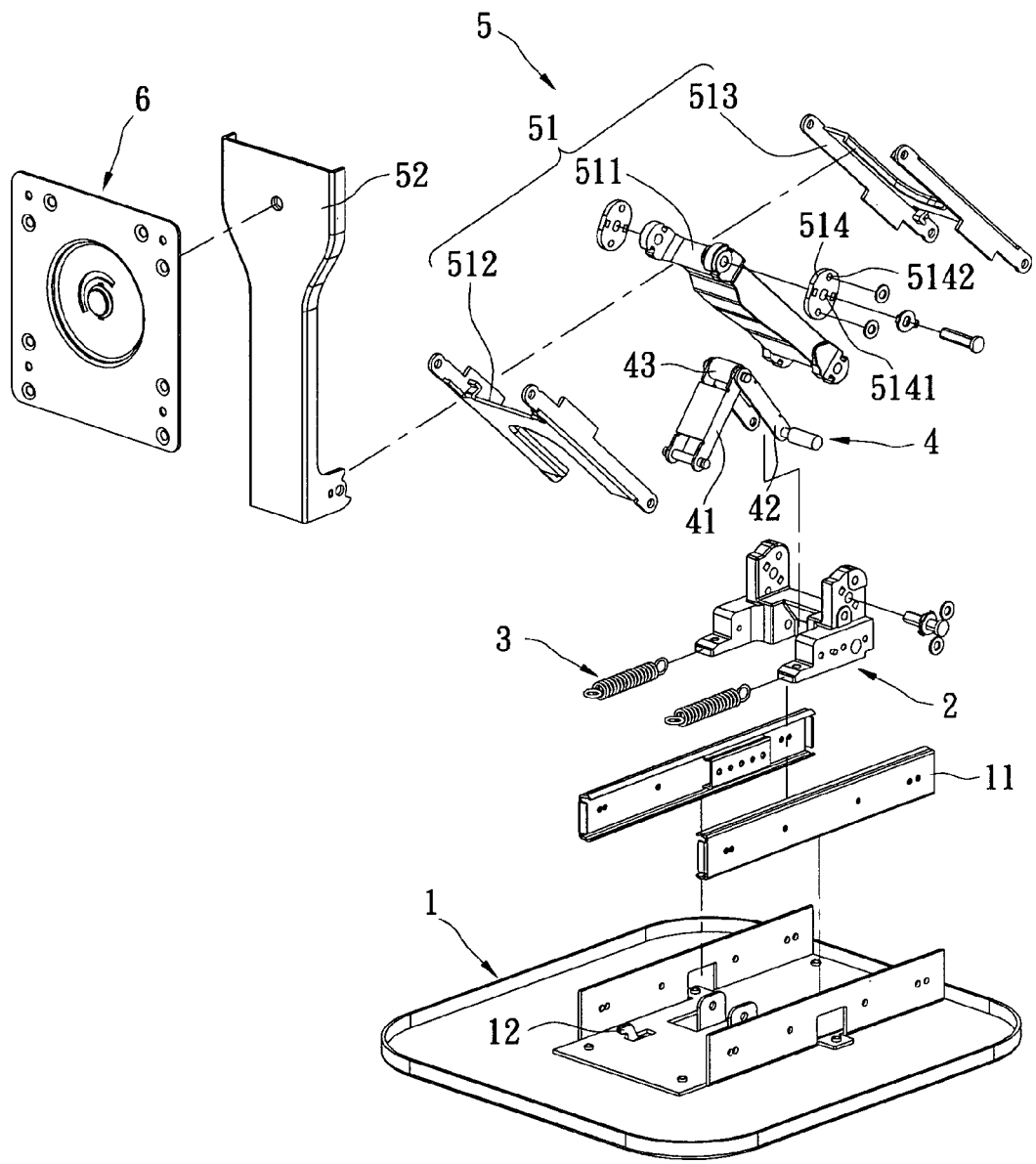
FIG. 2 is an exploded perspective view showing the bracket with a horizontal displacement compensation capacity according to the present invention.
Figure 3:
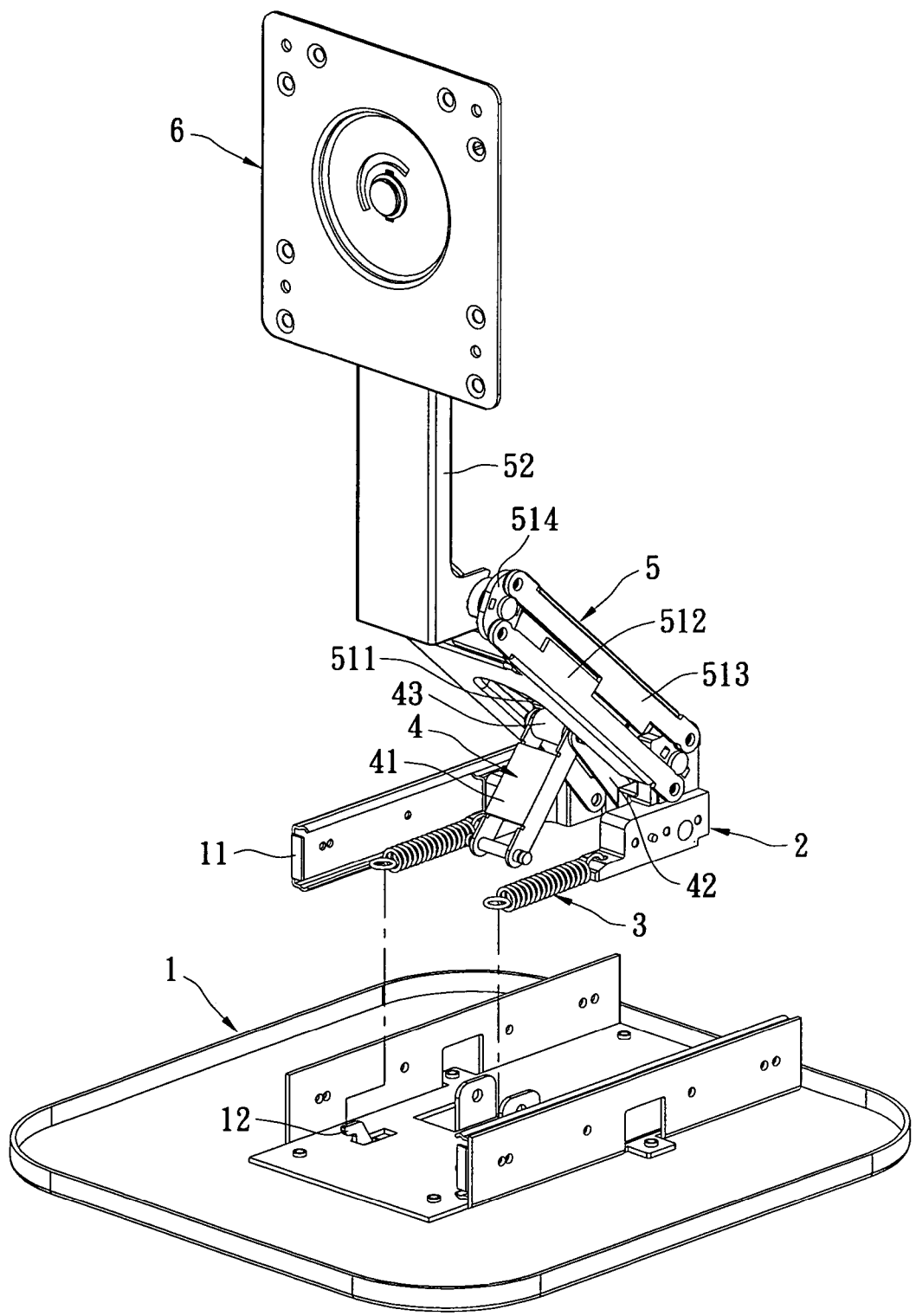
FIG. 3 is a partial assembled view showing the bracket with a horizontal displacement compensation capacity according to the present invention.
Figure 4:
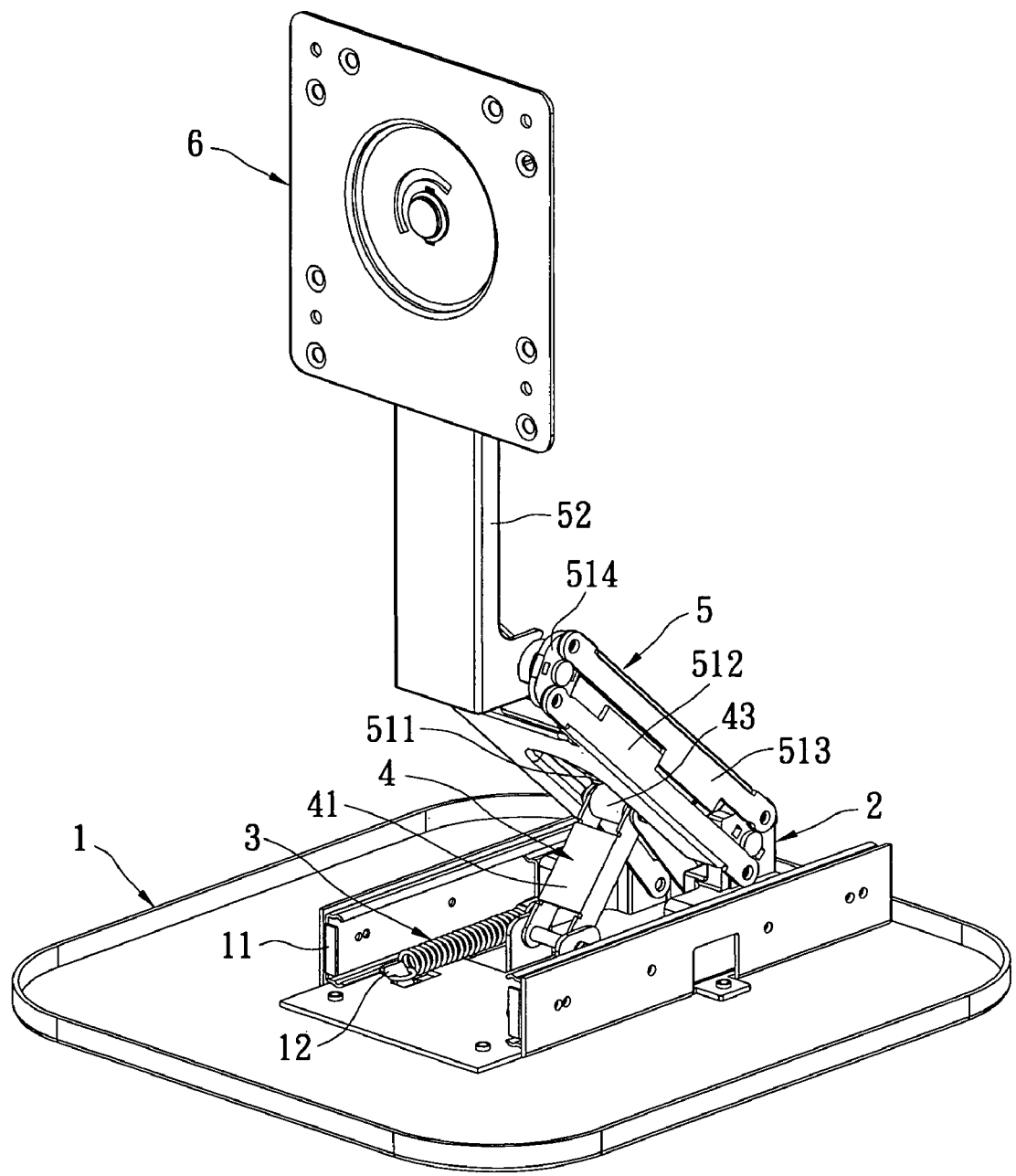
FIG. 4 is an assembled perspective view showing the bracket with a horizontal displacement compensation capacity according to the present invention.
Figure 5:
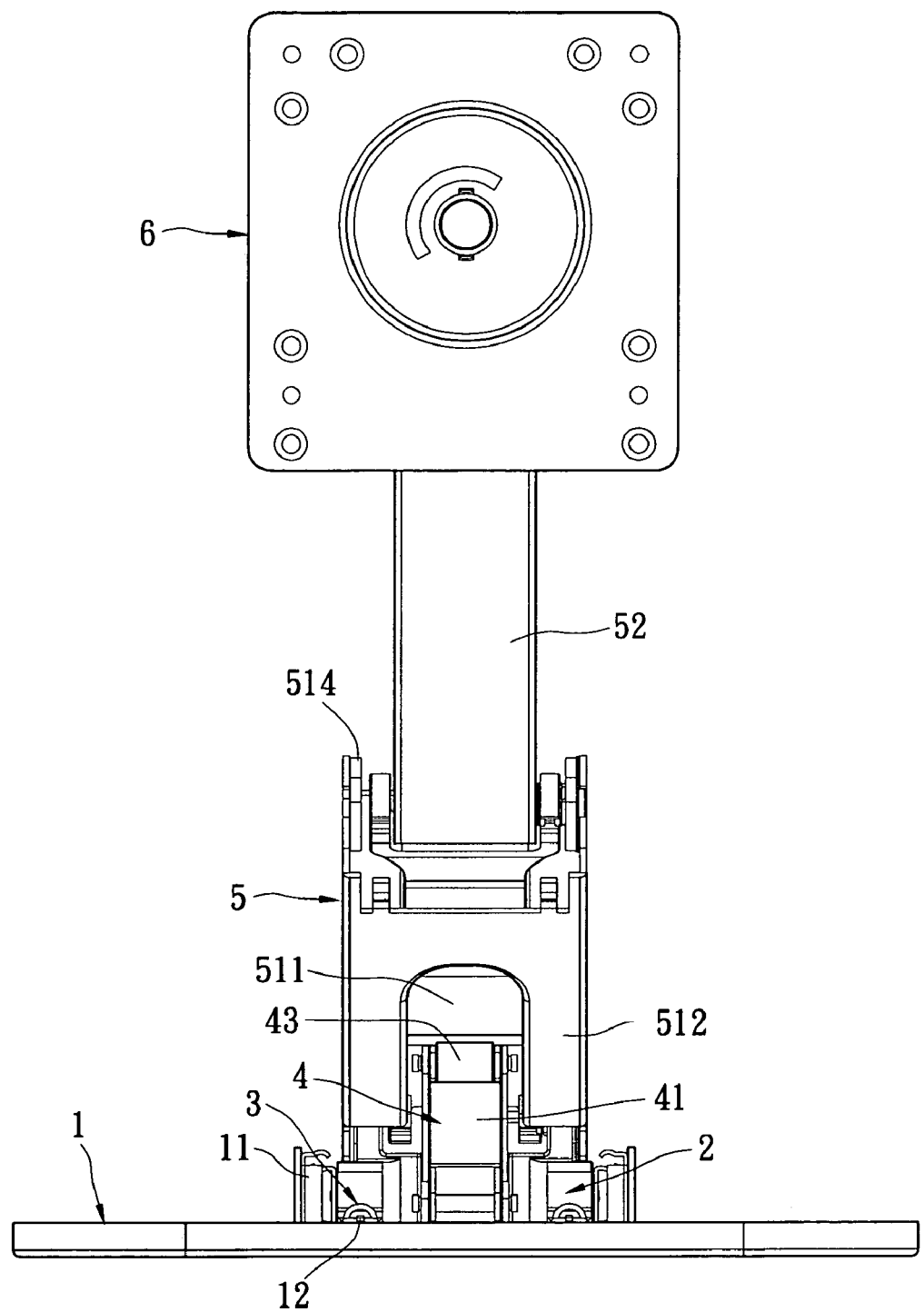
FIG. 5 is an assembled front view showing the bracket with a horizontal displacement compensation capacity according to the present invention.

Please refer to FIGS. 2 to 7. The present invention provides a bracket with a horizontal displacement compensation capacity, which includes a base 1, a sliding stand 2, at least one elastic element 3, a displacement compensation linkage assembly 4 and a support body 5.

Please refer to FIGS. 2 to 5. The base 1 is a wide and flat plate, whereby the bracket and a display 7 supported by the bracket can be firmly mounted on a table or other suitable position without turning over easily. The base 1 has two rails 11 and two hooks 12. The two rails 11 are provided in parallel on the base 1. The two hooks 12 extend upwardly from the base 1 and are disposed between the two rails 11.

The sliding stand 2 is able to slide on the base 1. Both sides of the sliding stand 2 are slidably disposed in the two rails 11 respectively. In this way, the sliding stand 2 can move in a predetermined linear and reciprocating manner on the base 1 forwardly and backwardly along a path formed by the two rails 11.

Two elastic elements 3 are provided to correspond to the two hooks 12. The elastic element 3 is a tension spring that is capable of withstanding a tension force. Both ends of the elastic element are fixedly hooked on the hook 12 of the base 1 and the sliding stand 2 respectively. In this way, the elastic element 3 can exert a tension force continuously on the sliding stand 2.

The displacement compensation linkage assembly 4 comprises a first rod 41, a second rod 42 and an abutting piece 43. The first rod 41 and the second rod 42 are formed into a plate-like structure, thereby increasing its structural strength. One end of the first rod 41 is pivotally connected to the base 1, and one end of the second rod 42 is pivotally connected to the sliding stand 2. The other end of the first rod 41 is pivotally connected to the other end of the second rod 42. The abutting piece 43 is pivotally provided at the pivoting portion between the first rod 41 and the second rod 42. Via this arrangement, when the sliding stand 2 slides on the base 1 due to the action force of the elastic element 3, the first rod 41 and the second rod 42 will act as a linage. The abutting piece 43 is abutted by the support body 5, thereby exerting or releasing the action force of the elastic element 3.

Incidentally, the above-mentioned first and second rods 41, 42 are not limited to rod-like or plate-like structure as long as they can be pivotally connected to each other thereby generate a predetermined linkage movement, which can be still considered as equivalents of the present invention.

The support body 5 is pivotally connected on the sliding stand 2 and abuts against the displacement compensation linkage assembly 4. The support body 5 comprises a swinging linkage assembly 51 and an arm 52. The swinging linkage assembly 51 comprises an abut-driving piece 511, a first dragging piece 512, a second dragging piece 513 and a rotating wheel 514.

The abut-driving piece 514 is a frame-like body. Both ends of the abut-driving piece 511 are pivotally connected to the sliding stand 2 and the arm 52.

The first dragging piece 512 and the second dragging piece 513 are formed into a cover plate respectively the same as the first rod 41 and the second rod 42. In this way, the structural strength can be improved greatly, thereby generating a predetermined linkage movement. The first dragging piece 512 covers on one end surface of the abut-driving piece 511 and straddles on both sides of the abut-driving piece. The first dragging piece 512 has a hollowed portion for exposing one end surface of the abut-driving piece 511, so that the abutting piece 43 can abut against this exposed end surface. The second dragging piece 513 covers on the other end surface of the abut-driving piece 511 and straddles on both sides of the abut-driving piece.

The rotating wheel 514 has a shaft hole 5141 and two rotating holes 5142; so named rotating holes 5142 because the first and second dragging pieces 512 and 513 are pivotally connected with these holes and rotates in these holes. One end of the abut-driving piece 511 and the arm 52 are pivotally connected to the shaft hole 5141 of the rotating wheel 514. The two rotating holes 5142 and the shaft hole 5141 are formed adjacent to each other. One ends of the first dragging piece 512 and the second dragging piece 513 are rotatably provided in the rotating holes 5142 of the rotating wheel 514. The other ends of the first dragging piece 512 and the second dragging piece 513 are pivotally connected on the sliding stand 2.

Via the above arrangement, when the support body 5 is swinging, the rotating wheel 514 will rotate accordingly to drag the first dragging piece 512 and the second dragging piece 513, so that the arm 52 can be kept in a vertical orientation synchronously with respect to the base 1 during the swinging of the abut-driving piece 511.

The arm 52 is provided with a supporting plate 6. The supporting plate 6 is a wide and thick plate. A display 7 is supported on the supporting plate 6 by connecting elements such as bolts. The display 7 can be a LCD display or a plasma display.

Figure 6:
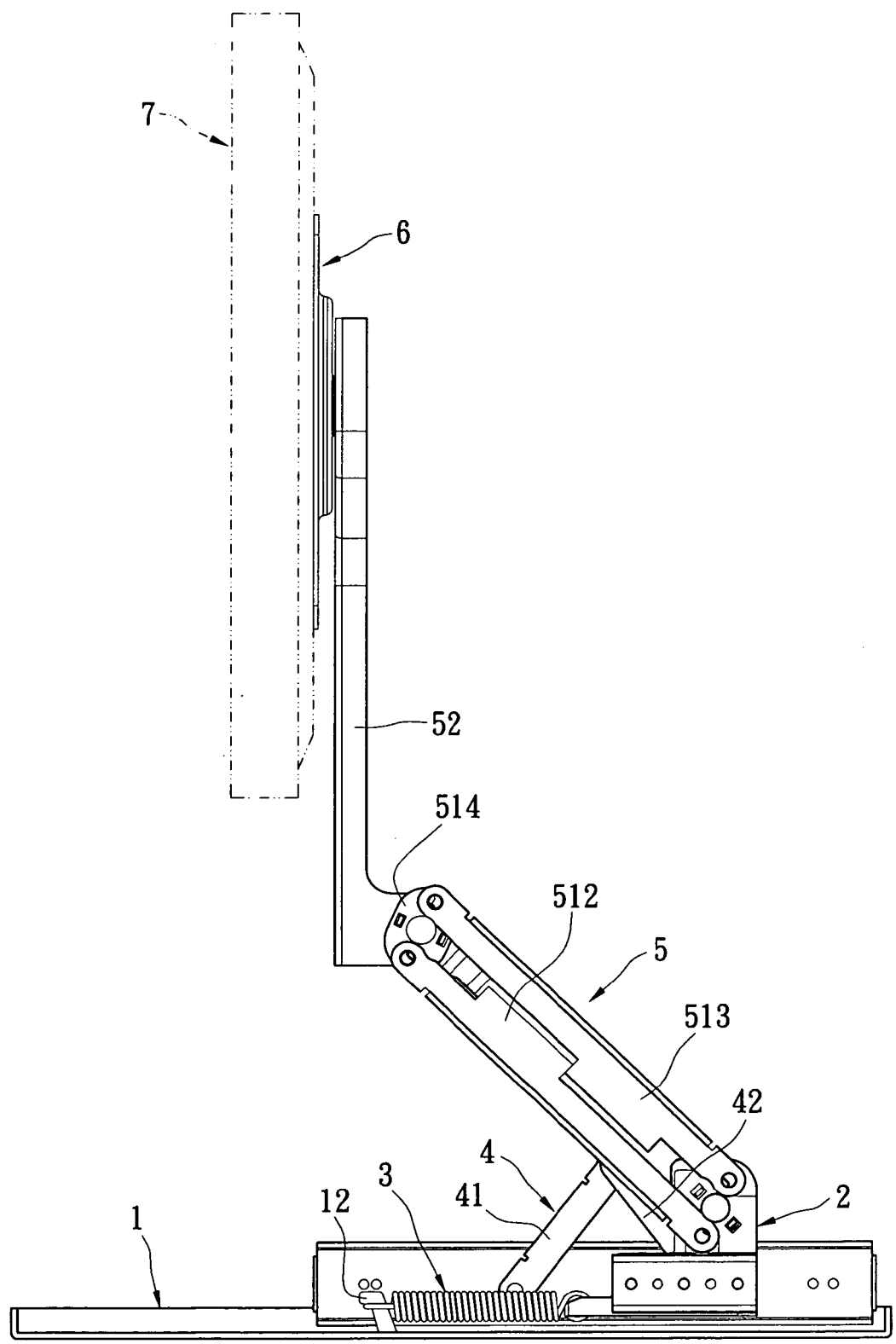
FIG. 6 is a schematic view (I) showing the action of the bracket with a horizontal displacement compensation capacity according to the present invention.
Figure 7:
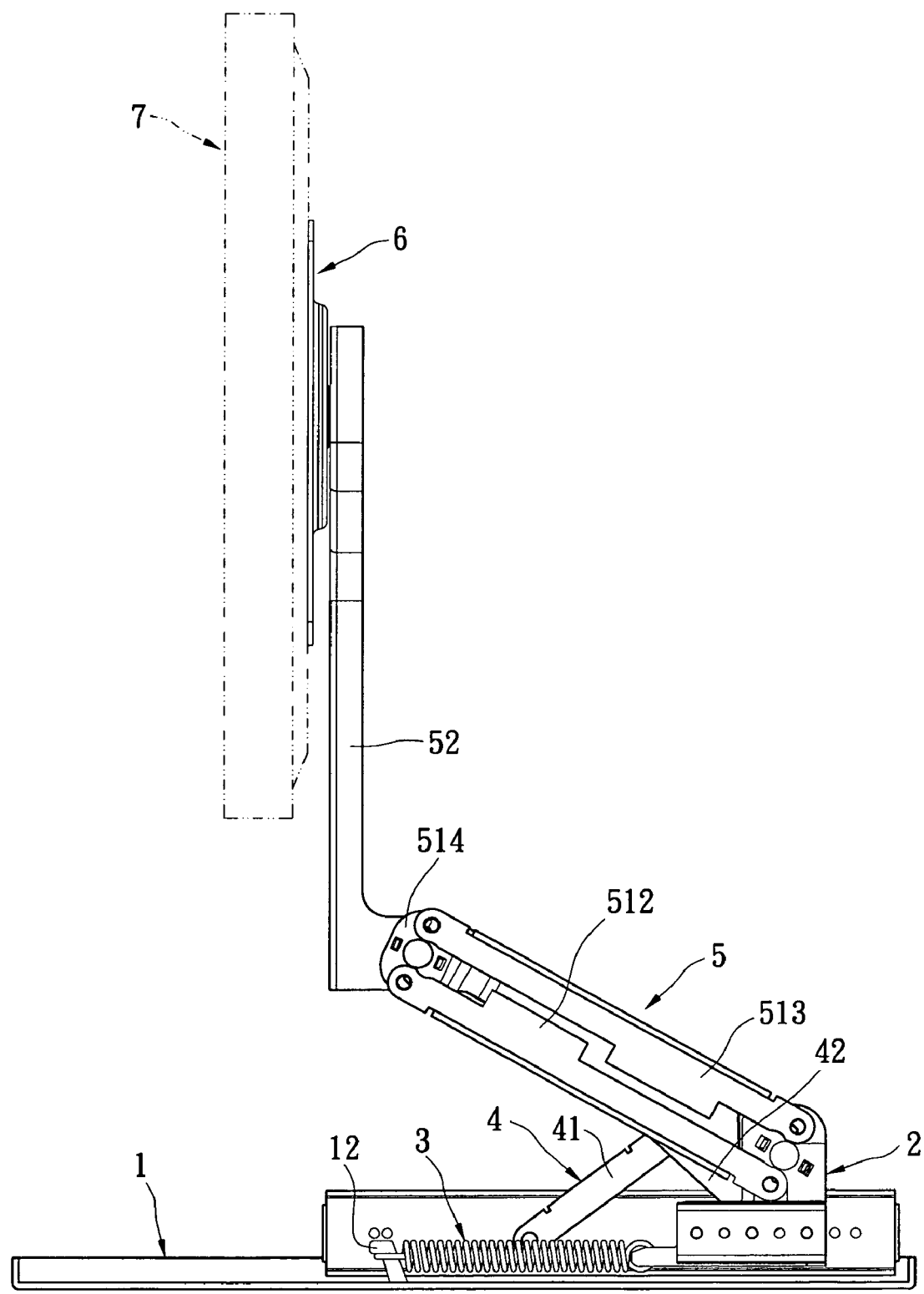
FIG. 7 is a schematic view (II) showing the action of the bracket with a horizontal displacement compensation capacity according to the present invention.

Please refer to FIGS. 6 and 7. Via the above constitution, when the user intends to adjust the height of the display 7, the user can swing the support body 5 and utilize the action of the elastic element 3, thereby exerting or releasing the action force of the abutting piece 43. As a result, the sliding stand 2 can be driven to slide forwardly or backwardly and thus generates a displacement compensation action in the horizontal direction. In this way, no matter the position that support body 5 swings, the display 7 can always be kept at its original horizontal position without changing the viewing distance between the display 7 and the user. Furthermore, while the abut-driving piece 511 is swinging, the first dragging piece 512 and the second dragging piece 513 totally cooperate with the rotating wheel 514, so that the display 7 can be synchronously kept in a constant vertical position with respect to the base 1.

The present invention has advantageous features as follows. Via the relative movement among the sliding stand 2, the elastic element 3 and the displacement compensation linkage assembly 4, when the support body 5 is swinging, a displacement compensation action in the horizontal direction can be generated. Thus, the user can adjust the relative height of the display 7, so that the viewing distance between the display 7 and the user can be kept constant. Furthermore, the vertical height can be adjusted and the horizontal distance can be kept simultaneously, thereby improving the impression and vantage point in use.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A bracket with a horizontal displacement compensation capacity, comprising:
    a base;
    a sliding stand sliding on the base;
    an elastic assembly having two ends fixedly connected to the base and the sliding stand respectively;
    a displacement compensation linkage assembly comprising a first rod, a second rod and an abutting piece, one end of the first rod being pivotally connected to the base, one end of the second rod being pivotally connected to the sliding stand, the other and of the first rod being pivotally connected to the other end of the second rod, the abutting piece being pivotally connected to the pivoting portion between the other ends of the first and second rods; and
    a support body pivotally connected on the sliding stand and abutting against the abutting piece of the displacement compensation linkage assembly.

2. The bracket according to claim 1, wherein the base is provided with two rails, and both sides of the sliding stand are slidingly disposed on the two rails.

3. The bracket according to claim 2, wherein the base has two hooks, the elastic assembly has two elastic elements, and the elastic elements are respectively fixed between the hooks of the base and the sliding stand.

4. The bracket according to claim 3, wherein each of the elastic elements is a tension spring.

5. The bracket according to claim 1, wherein the support body comprises a swinging linkage assembly and an arm, the swinging linkage assembly comprises an abut-driving piece, both ends of the abut-driving piece are pivotally connected to the sliding stand and the arm respectively, and the abut-driving piece abuts against the abutting piece of the displacement compensation linkage assembly.

6. The bracket according to claim 5, wherein the swinging linkage assembly comprises a rotating wheel, the rotating wheel has a shaft hole, the abut-driving piece and the arm are pivotally connected to the shaft hole of the rotating wheel.

7. The bracket according to claim 6, wherein the rotating wheel has two rotating holes, the two rotating holes and the shaft hole are formed adjacent to each other, the swinging linkage assembly comprises a first dragging piece and a second dragging piece, one ends of the first dragging piece and the second dragging piece are pivotally connected to the rotating holes of the rotating wheel, the other ends of the first dragging piece and the second dragging piece are pivotally connected to the sliding stand.

8. The bracket according to claim 7, wherein the arm is provided with a supporting plate.

9. The bracket according to claim 8, wherein a display is supported on the supporting plate.

\* \* \* \* \*